(12) United States Patent
Uesaka

(10) Patent No.: US 7,334,736 B2
(45) Date of Patent: Feb. 26, 2008

(54) ANTENNA-COIL DESIGN APPARATUS AND DESIGN METHOD

(75) Inventor: Kouichi Uesaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 393 days.

(21) Appl. No.: 10/890,320

(22) Filed: Jul. 14, 2004

(65) Prior Publication Data

US 2005/0011961 A1  Jan. 20, 2005

(30) Foreign Application Priority Data

Jul. 14, 2003 (JP) .............................. 2003-196179

(51) Int. Cl.
*G06K 19/06* (2006.01)
(52) U.S. Cl. ..................... 235/492; 235/451; 235/487; 235/380
(58) Field of Classification Search ................ 235/492, 235/451, 487, 380; 343/855, 867
See application file for complete search history.

(56) References Cited

U.S. PATENT DOCUMENTS

| 4,430,729 | A * | 2/1984 | Toyooka et al. ............... 365/6 |
| 6,593,841 | B1 * | 7/2003 | Mizoguchi et al. .......... 336/200 |
| 2002/0014859 | A1 * | 2/2002 | Boulesteix .................. 315/219 |
| 2002/0053598 | A1 * | 5/2002 | Kobayashi et al. .......... 235/492 |
| 2002/0096568 | A1 * | 7/2002 | Arisawa ...................... 235/492 |
| 2003/0016506 | A1 * | 1/2003 | Fujii ........................... 361/737 |
| 2005/0272371 | A1 * | 12/2005 | Komatsuzaki et al. ..... 455/41.2 |
| 2006/0097874 | A1 * | 5/2006 | Salesky et al. ........... 340/572.1 |
| 2006/0164249 | A1 * | 7/2006 | Lutz et al. ............... 340/572.7 |
| 2006/0220863 | A1 * | 10/2006 | Koyama .................. 340/572.1 |
| 2006/0283948 | A1 * | 12/2006 | Naito ......................... 235/451 |

FOREIGN PATENT DOCUMENTS

| JP | 07-022976 | 1/1995 |
| JP | 7-22976 | 1/1995 |
| JP | 10-079613 | 3/1998 |
| JP | 11-272826 | 10/1999 |
| WO | 02/095870 | 11/2002 |

* cited by examiner

*Primary Examiner*—Steven S. Paik
(74) *Attorney, Agent, or Firm*—Antonelli, Terry, Stout & Kraus, LLP.

(57) ABSTRACT

A method of designing on a short-time basis an antenna which satisfies desired electrical characteristic values. There is provided the method of designing the antenna coil used in a non-contact IC card or a RFID. Here, the antenna-coil design method includes the following steps: Inputting information about plural configurations of the antenna coil and materials thereof, analyzing resistance, inductance, and stray capacitance of the antenna coil relative to the number of turns of the antenna coil in the inputted plural configurations of the antenna coil, and, based on the analysis result, selecting one of the plural configurations of the antenna coil.

10 Claims, 7 Drawing Sheets

SQUARE-FIGURED TYPE

SQUARE-FIGURED TYPE

FIG. 7

| | Ant.1 | Ant.2 | Ant.3 | Ant.4 | |
|---|---|---|---|---|---|
| ANTENNA NAME | | | | | |
| TURN START/SURFACE NUMBER OF TURNS | 1 | 1 | 1 | 1 | TURN |
| TURN FINISH/REAR-SURFACE NUMBER OF TURNS | 24 | 15 | 20 | 15 | TURNS |
| x-DIRECTION OUTER SIZE (Lx) | 80.00 | 80.00 | 56.60 | 56.60 | [mm] |
| y-DIRECTION OUTER SIZE (Ly) | 50.00 | 50.00 | 46.40 | 46.40 | [mm] |
| x-DIRECTION WIRING WIDTH (Wx) | 0.50 | 0.50 | 0.50 | 0.50 | [mm] |
| y-DIRECTION WIRING WIDTH (Wy) | 0.50 | 0.50 | 0.50 | 0.50 | [mm] |
| x-DIRECTION WIRING PITCH (Px) | 1.00 | 1.50 | 1.00 | 1.50 | [mm] |
| y-DIRECTION WIRING PITCH (Py) | 1.00 | 1.50 | 1.00 | 1.50 | [mm] |
| LINE THICKNESS (t) | 36.00 | 36.00 | 36.00 | 36.00 | [μm] |
| CORNER RADIUS (rx) | 0.00 | 0.00 | 28.05 | 28.05 | [mm] |
| CORNER RADIUS (ry) | 0.00 | 0.00 | 22.95 | 22.95 | [mm] |
| WIRING RESISTIVITY | 2.47 | 2.47 | 2.47 | 2.47 | [μΩ·cm] |
| ROTATION ANGLE | 0.00 | 0.00 | 30.00 | 30.00 | [deg] |
| CONFIGURATION TYPE | B | B | B | B | |
| LAYER STRUCTURE | 1 LAYER | 1 LAYER | 1 LAYER | 1 LAYER | |
| PRIORITY ITEM | ACCURACY | ACCURACY | ACCURACY | ACCURACY | |

FIG. 8

| ELECTRICAL CHARACTERISTICS | NOTATION | ANTENNA ELEMENTS MAKING SIGNIFICANT CONTRIBUTIONS TO ELECTRICAL CHARACTERISTICS |
|---|---|---|
| RESISTANCE R | Rrw, Rcd | WIRING CROSS-SECTION CONFIGURATION, MATERIAL |
| INDUCTANCE L | Lrw, Lcd | WIRING CONFIGURATION |
| STRAY CAPACITANCE C | Crw, Ccd | WIRING CONFIGURATION, MATERIAL |
| COMMUNICATIONS DISTANCE | d | WIRING CONFIGURATION |
| COUPLING COEFFICIENT | k | L,d |
| RESONANCE FREQUENCY | fc | L,C |
| COMMUNICATIONS BANDWIDTH | Q | R,L,C |

FIG. 9

| CONFIGURATION | SQUARE CONFIGURATION 1 | SQUARE CONFIGURATION 2 | ELLIPTIC CONFIGURATION 3 | ELLIPTIC CONFIGURATION 4 |
|---|---|---|---|---|
| OUTER-CONFIGURATION L(mm) | 80.0×50.0 | | 57.0×46.0 | |
| LINE WIDTH w(mm) | 0.5 | | | |
| PITCH p(mm) | 1.0 | 1.5 | 1.0 | 1.5 |
| LINE THICKNESS t(μm) | 36.0 | | | |

ANTENNA-COIL DESIGN APPARATUS AND DESIGN METHOD

CROSS-REFERENCE TO RELATED APPLICATION

The disclosure of Japanese Patent Application No. JP2003-196179 filed on Jul. 14, 2003 including the specification, drawings and abstract is incorporated herein by reference in its entirety.

BACKGROUND OF THE INVENTION

The present invention relates to a design method and design apparatus for designing an antenna coil used in a non-contact IC card or a RFID.

In the non-contact IC card, the RFID, or the like (which, hereinafter, will be referred to as "IC card or the like"), an electromagnetic field (magnetic field) radiated by a reader/writer unit (hereinafter, referred to as "R/W") is received by an antenna formed on the IC card or the like. Then, the electromagnetic field (magnetic field) received is converted into electric power so as to drive the IC. Also, communications from the R/W to the IC card or the like are performed using signal components contained in modulation and the like of the electromagnetic field (more essentially magnetic field in this case) radiated by the R/W. Moreover, in communications from the IC card or the like to the R/W, the signal transmissions to the R/W are performed by load modulation or the like.

At this time, the electric power which is receivable by the IC card or the like is determined based on the self inductances, mutual inductance, and coupling coefficient of the antenna formed on the IC card or the like and an antenna formed on the R/W. Furthermore, it is required that the electric power which is supplyable to the R/W antenna be suppressed within a range in which the electric field radiated from the R/W antenna satisfies the regulations by the Radio Law or the like.

This requirement determines an upper-limit of the electric power supplyable to the R/W antenna. In addition, the electric power to be received is determined from a transmission efficiency of the electric power to the IC card or the like. As a result, the communications area is determined.

Accordingly, it is required that electrical elements of the coil antenna to be formed on the IC card or the like, e.g., the antenna's inductance, resistance, and capacitance, be designed while satisfying various conditions by considering the coil antenna itself and its relationship with the R/W.

Meanwhile, as antenna design technologies and analysis technologies for the antenna design, there exist such methods as the moment method and finite-element method. These techniques, however, are the following methods: Configuration data on an antenna is inputted first, and then respective types of set conditions (i.e., boundary conditions and so on) are set for this configuration, and after that, the analysis is performed. A conventional antenna design method has been disclosed in, e.g., JP-A-7-22976. This conventional method is as follows: With respect to a frequency range necessary for the antenna design, frequency characteristics of respective elements of an impedance matrix in the moment method are stored into a memory in advance. This in-advance storage allows a significant reduction in the computation time necessary for the antenna design.

SUMMARY OF THE INVENTION

In the conventional techniques, the antenna configuration is determined at first, and after that, the antenna's electrical characteristic values for the time or frequency are computed. Consequently, if, after the determination of the antenna configuration, the computed antenna's electrical characteristic values for the time or frequency have failed to satisfy predefined values, it becomes required to determine a new antenna configuration once again. Namely, there has existed a problem of being incapable of effectively reducing the time for the antenna design.

The present invention has been devised in order to solve the above-described problem. Namely, an object of the present invention is to design, on a short-time basis, an antenna which satisfies preset electrical characteristic values without the necessity for redesigning configuration of the antenna many times in accordance with the analysis result of the electrical characteristics or the like.

In the present invention, a frequency to be used for the IC card or the like is determined at first. After that, the antenna's electrical characteristic values for configuration of the antenna on the IC card or the like are computed. Also, when computing and displaying the electrical characteristic values for a predetermined frequency, e.g., relationship between the antenna's number of turns and resistance value, the display is performed in such a manner that a comparison is made among the results computed for each antenna configuration prepared in advance.

Other objects, features and advantages of the invention will become apparent from the following description of the embodiments of the invention taken in conjunction with the accompanying drawings.

BRIEF DESCRIPTION OF THE DRAWINGS

FIG. 7 illustrates an example of input parameters for square-figured and ellipse-figured spiral antennas;

FIG. 8 is a table for illustrating electrical characteristics of the IC-card antenna and those of the R/W antenna; and FIG. 9 is a table for summarizing antenna configurations in the respective embodiments of the IC card.

DETAILED DESCRIPTION OF THE INVENTION

Figure 1:
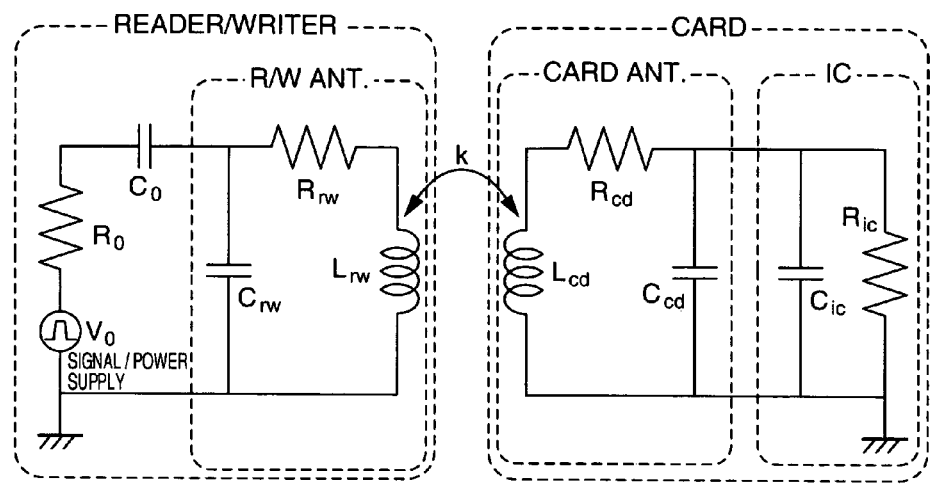
FIG. 1 illustrates an equivalent circuit of a non-contact IC card and a R/W.

Referring to the drawings, the explanation will be given below concerning embodiments of the present invention. Incidentally, it is needless to say that, although the explanation will be given below regarding a non-contact IC card, the explanation is also applicable to the design and analysis of such antennas as a RFID.

First, electrical elements will be investigated which become important between the non-contact IC card or the like and a reader/writer unit (:R/W) in the case of designing the non-contact IC card or the like.

FIG. 1 illustrates an equivalent circuit of the R/W and the IC card. In this equivalent circuit, the R/W includes circuit impedance $R_0$, resonance capacitance $C_0$, inductance $L_{rw}$ of a R/W antenna, resistance $R_{rw}$, and capacitance $C_{rw}$. Here, resonance frequency of the R/W is determined as being equal to carrier-wave frequency, or frequency which exceeds the carrier-wave frequency. Next, the IC card includes inductance $L_{cd}$ of a card antenna, resistance $R_{cd}$, capacitance $C_{cd}$, capacitance $C_{ic}$ which an IC to be mounted thereon exhibits, and resistance $R_{ic}$ which is equivalent to the electric power consumed.

Here, resonance frequency of the IC card is also determined as being equal to the carrier-wave frequency, or the frequency which exceeds the carrier-wave frequency. Moreover, coupling coefficient k, which means coupling between the R/W and the IC card, is set simultaneously, thereby forming the entire equivalent circuit. In the above-described equivalent circuit, power supply $V_o$ is determined from R/W-antenna electric power which satisfies the regulations by the Radio Law or the like.

From this situation, it becomes required to determine $L_{rw}$, $C_{rw}$, $C_o$, $L_{cd}$, $C_{cd}$, and $C_{ic}$ which maximize electric-power transmission efficiency, and the coupling coefficient k which is to be determined by position relationship between the R/W and the IC card. Also, from the objective of performing communications, it becomes required to determine communications bandwidth so that sub carrier wave can be transmitted enough. This communications bandwidth is determined by $R_{rw}$, $L_{rw}$, $C_{rw}$, $C_o$, $R_{cd}$, $L_{cd}$, $C_{cd}$, $C_{ic}$, and $R_{ic}$, and the coupling coefficient k.

Here, it is true that the electrical characteristic values of the antennas depend on the used frequency to a certain extent. Basically, however, the characteristic values are determined by configuration or material of the antennas. Concretely, the details are just what are explained in FIG. 8.

Subsequently, the explanation will be given below concerning the electrical characteristics explained above, and an antenna design method using antenna elements (i.e., wiring configuration, material, and the like) which make significant contributions to the electrical characteristics. As described earlier, the conventional antenna design method is as follows: The antenna configuration is determined and inputted at first, and then the antenna elements, which become foundation of the respective types of electrical characteristic parameters, are determined and inputted. Next, the electromagnetic-field analysis is performed, and then the analysis result is displayed. Furthermore, if the analysis result has failed to satisfy the predetermined conditions, the antenna configuration is considered and inputted once again.

Figure 2:
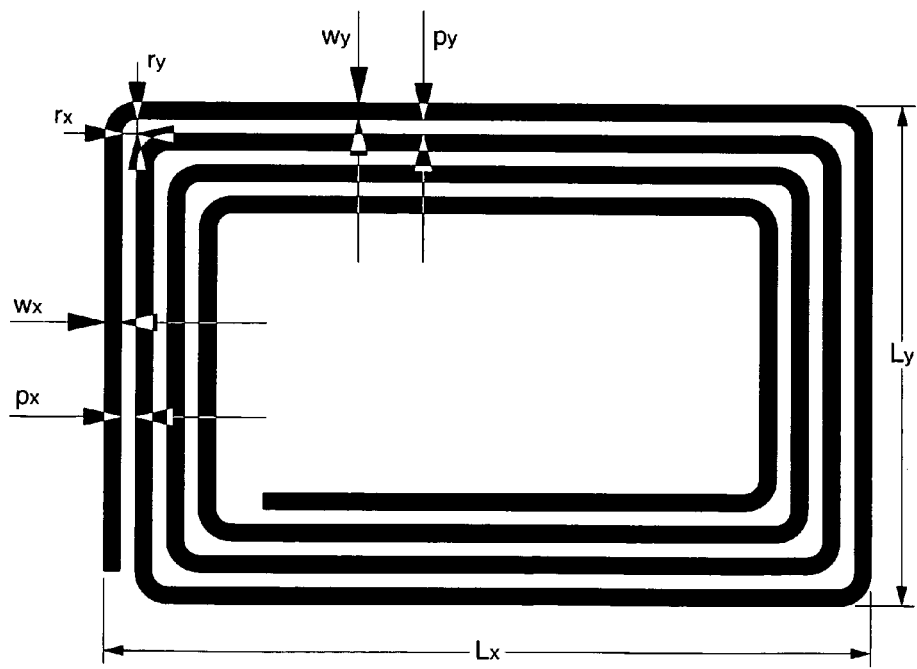
FIG. 2 illustrates an example of input parameters of square-figured and ellipse-figured spiral antennas.

On the other hand, in the application according to the present invention, parameters of plural different antenna-coil configurations prepared in advance are inputted. Here, the plural antenna configurations are selected, and the parameters having a predetermined range are inputted. FIG. 2 illustrates an example of the analysis method and the input parameters of square-figured and ellipse-figured spiral antennas. In the case of the square-figured spiral antenna, the configuration is set for antenna parameters, i.e., outer-configuration size $L_x$, $L_y$, line width $w_x$, $w_y$, pitch $p_x$, $p_y$, line thickness t, and corner radius $r_x$, $r_y$. Similarly, in the case of the ellipse-figured spiral antenna, the configuration is set for antenna parameters, i.e., outer-configuration size $L_x$, $L_y$, line width $w_x$, $w_y$, pitch $p_x$, $p_y$, line thickness t, and radius $r_x(=(L_x-w_x)/2)$, $r_y(=(L_y-w_y)/2)$. In the present embodiment, the following parameters have been inputted as an example:

In this case, by selecting the number N of turns of an antenna as a parameter, it is possible to determine the respective types of electrical characteristic values (e.g., resistance R, inductance L, and capacitance C) of the antenna.

Figure 3A:
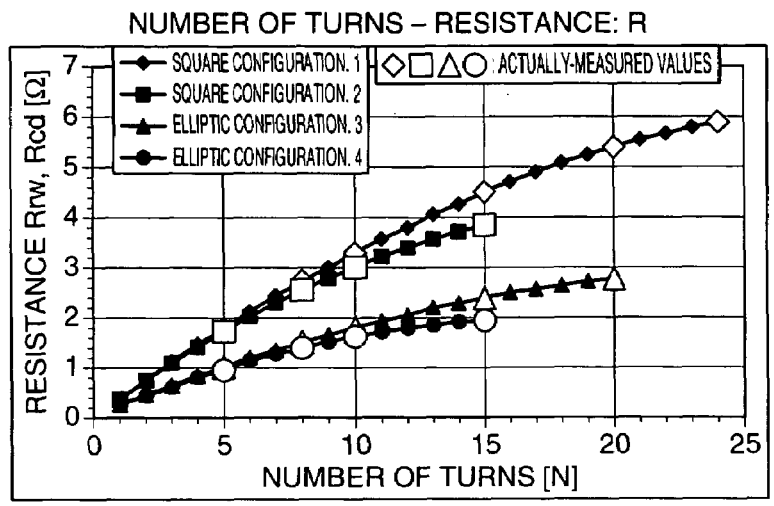
FIGS. 3A to 3C illustrate an example of analysis result of the antenna according to the present application.
Figure 3B:
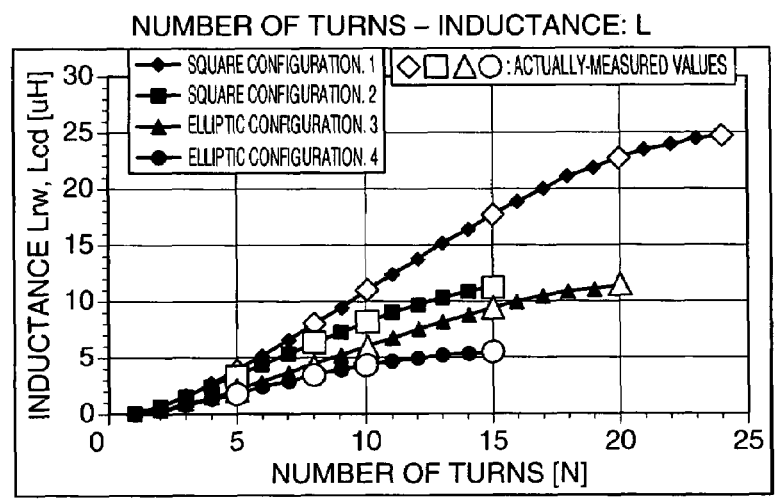
Figure 3C:
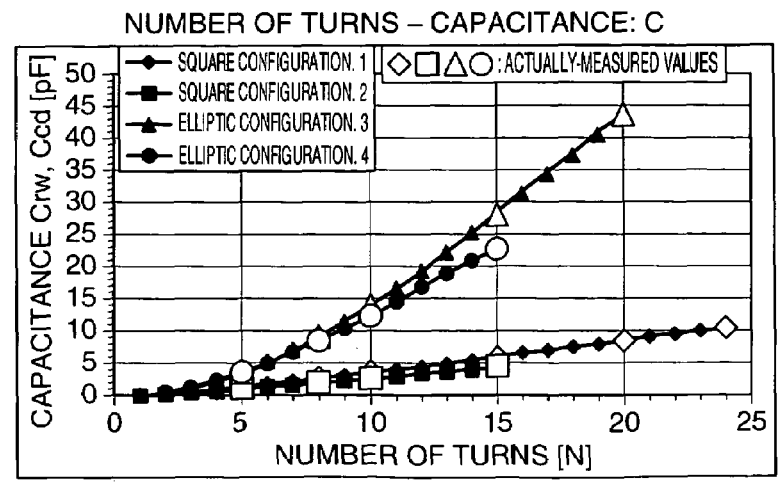

FIGS. 3A to 3C, with respect to the above-described input parameter, illustrate relationship between the turn-number of the antenna and the resistance R thereof (FIG. 3A), relationship between the turn-number of the antenna and the inductance L thereof (FIG. 3B), and relationship between the turn-number of the antenna and the stray capacitance C thereof (FIG. 3C). FIGS. 3A to 3C indicate the following results: Concerning the resistance R, since the turn-number of the spiral configuration is defined from the outer circumference, an increase in the line-path length becomes smaller as the turn-number increases. This results in saturation of an increase in the resistance R in accompaniment with the increase in the turn-number. Also, regarding the inductance L, as the turn-number increases, the self inductance increases in response to the line-path length, and also mutual inductance between the line paths increases. This allows the inductance L to exhibit an S-character-like characteristic. Also, the stray capacitance C (i.e., parasite capacitance) increases in accompaniment with the increase in the turn-number.

Incidentally, the antenna outer-configuration (i.e., length of the outermost circumference) and the antenna's pitch have been inputted. This makes it possible to determine upper-limit of the turn-number of the antenna.

Here, the electrical characteristics of the antenna will be investigated. The increase in the resistance R means that a loss in the antenna increases, which is not an advisable policy from the standpoint of the electric-power transmission. The increase in the inductance L, however, is desirable, because the increase in the inductance increases the electric-power transmission efficiency. Also, as regards the stray capacitance (i.e., parasite capacitance), considering that the antennas are made resonant with each other at a used frequency (i.e., carrier-wave frequency), the increase in the stray capacitance (i.e., parasite capacitance) is desirable. The reason for this is as follows: For the purpose of earning capacitance needed at the frequency with respect to the inductance, as this capacitance gets larger, the capacitance $C_{ic}$ to be mounted within the IC gets smaller. This means that the resultant chip area becomes smaller, which is desirable. If, however, the resonance frequency grows lower than the carrier-wave frequency, it becomes impossible to optimize the electric-power transmission efficiency. This brings about a disadvantage, although the capacitance within the IC is unnecessary. This whole situation indicates that, depending on a used protocol or the like, there exist optimum values for the resistance R, inductance L, and capacitance C of the antenna.

In order to determine these optimum values, the further investigation needs to be performed concerning self-resonance frequency $f_c$ and quality Q of the inductance L from the resistance R, inductance L, and capacitance C of the antenna. Here, Q denotes "Quality Factor", which means quality of the configuration components L, C, and the like, i.e., essential attribute of L which is specific to L, essential attribute of C which is specific to C, and the like.

Figure 4A:
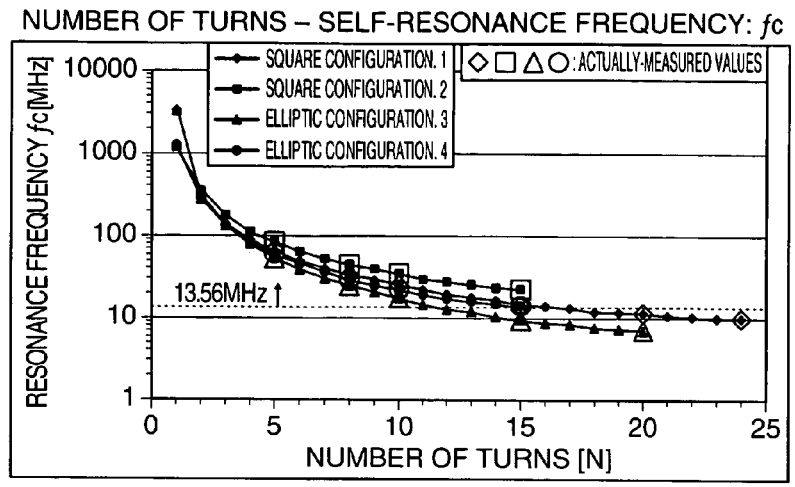
FIGS. 4A to 4C illustrate an example of analysis result of the antenna according to the present application.
Figure 4B:
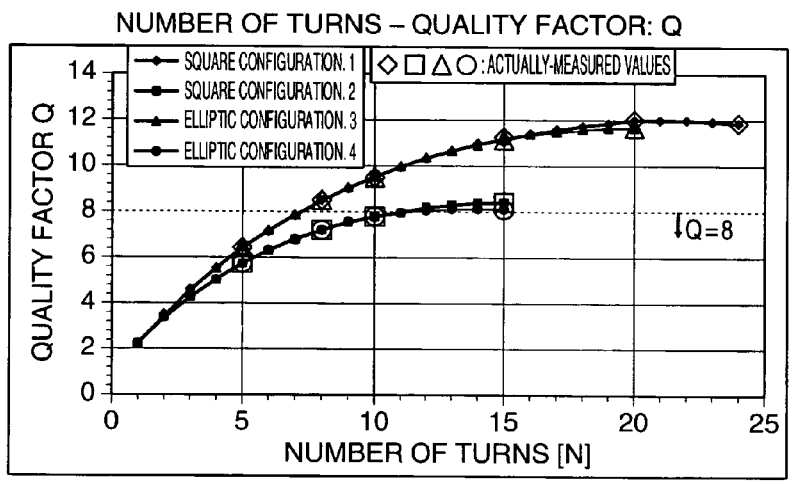
Figure 4C:
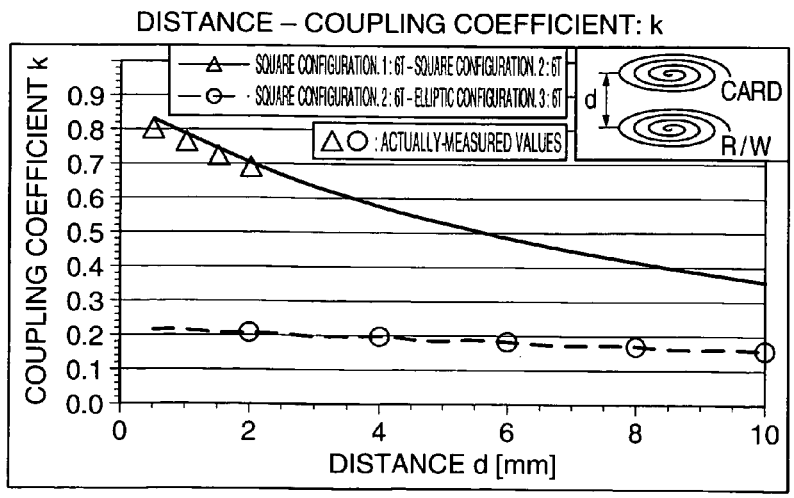

FIGS. 4A to 4C illustrate the results which, using the resistance R, inductance L, and capacitance C of the antenna computed above, are acquired by computing relationship between the turn-number of the antenna and the self-resonance frequency $f_c$ thereof (FIG. 4A), and relationship between the turn-number of the antenna and the inductance thereof or Q containing the IC (FIG. 4B). Incidentally, in the simulation of the present embodiment, the bandwidth BW of the sub carrier wave is equal to (847.5 kHz×2) in the case where the carrier-wave frequency and transmission rate are set as 13.56 MHz and 211.875 k respectively.

On account of this, the self-resonance frequency $f_c$ needs to be higher than 13.56 MHz. On account of this, the turn-number needs to be smaller than 11 to 15. Also, the chip area makes it possible to determine upper-limit of the capacitance $C_{ic}$ which is mountable within the IC. If the upper-limit falls within, e.g., 50 pF, judging from $C_{ic}=1/((2\pi f_c)^2 \times L_{cd}) - C_{cd}$, the turn-number needs to be larger than 5 here. Also, since the necessary communications band satisfies Q<13.56 MHz/(847.5 kHz×2)=8, the turn-number needs to be smaller than 7 to 10.

Summarizing the above-described conditions indicates that the optimum turn-number range turns out to be 5 to 7.

Moreover, FIG. 4C illustrates the result acquired by computing relationship between the distance and the coupling coefficient between the non-contact IC card or the like and the reader/writer unit (:R/W). This coupling coefficient exerts tremendous influences on the electric-power transmission efficiency. Namely, the larger this value gets, the better the efficiency becomes.

In the present embodiment, from the above-described relationship between the antenna turn-number and the self-resonance frequency $f_c$ (FIG. 4A), and relationship between the antenna turn-number and the Q value (FIG. 4B), it has been recognized that the antenna turn-number smaller than 7 is desirable. Consequently, the turn-number 6 has been selected as target turn-number by taking the margin into consideration.

The distance characteristic of the coupling coefficient k is determined regarding a case of two square-figured spiral antennas having different pitches, and a case of a square-figured spiral antenna and an ellipse-figured spiral antenna.

Here, in the case of the two square-figured spiral antennas, it is true that the value of the coupling coefficient is large. Causing the IC to operate at the maximum value, however, makes the operation impossible at a location where the coupling coefficient is small. On the other hand, the operation is made possible at the location where the coupling coefficient is small. This operation causes an induced voltage to exceed the withstand voltage of the IC at a location where the coupling coefficient is large, thus becoming the cause of a failure. On account of this, in the case of wishing to enlarge the communications area, the combination of the square-figured spiral antenna and the ellipse-figured spiral antenna is desirable where a variation Δk in the coupling coefficient is small.

Figure 5:
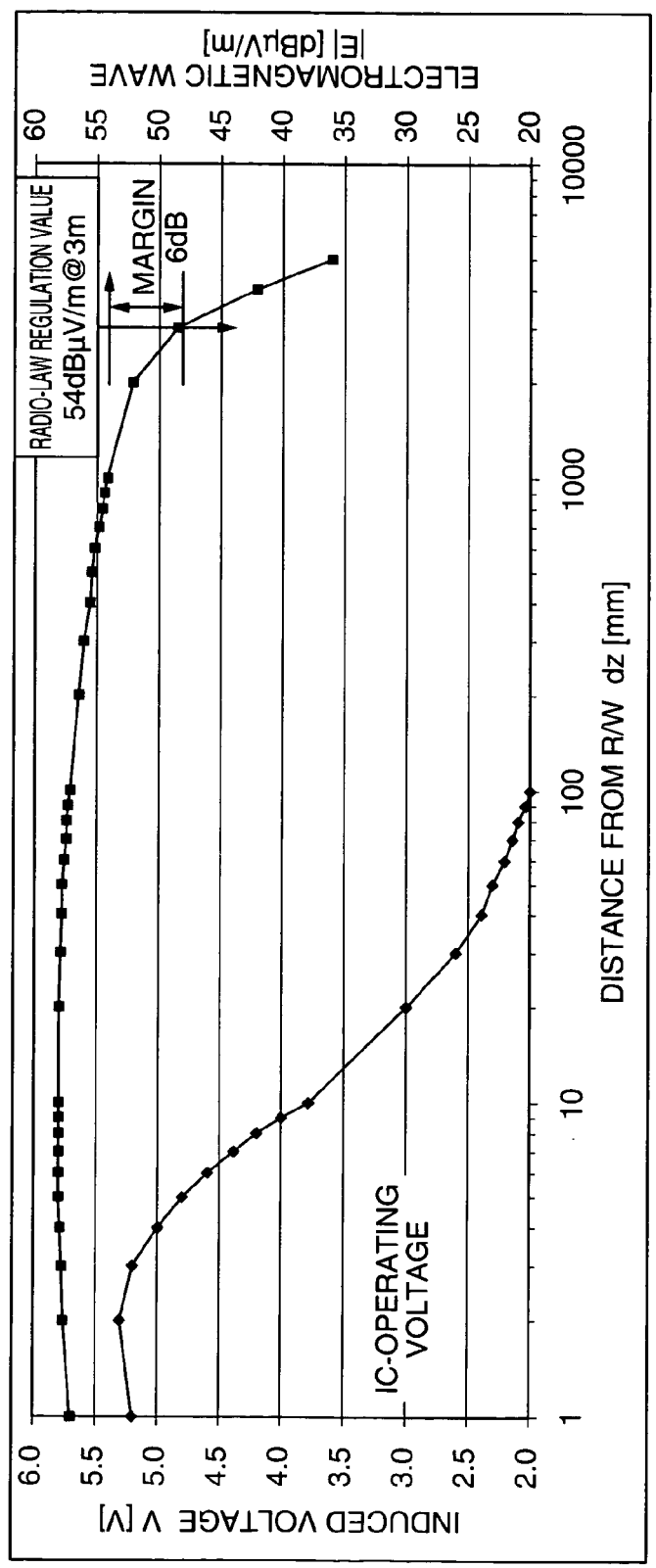
FIG. 5 illustrates an example of analysis result of the antenna according to the present application.

Finally, FIG. 5 illustrates the result acquired by analyzing the electromagnetic field (electric field or magnetic field) radiated from the antenna. Here, the value is illustrated which can be considered to be converted into the electric-field strength from a voltage value in the case where the electric-field strength or magnetic-field strength with respect to the distance from the spiral antenna is received by a loop antenna stipulated by the regulations.

The upper-limit of the electric power which is supplyable to the R/W antenna becomes a value which satisfies the Radio-Law regulation value (i.e., 54 dB□V/m@3 m). In the present application, further, the electric power acquired by taking into consideration the margin 6 dB to the Radio-Law regulation value is supplied to the R/W.

FIG. 5 simultaneously illustrates computation result of the voltage (i.e., voltage to be received) induced at an IC-end portion on the IC-card side when this electric power is supplied to the R/W antenna. As a result of this, in the system of this antenna and the IC, the voltage attains to, e.g., the maximum voltage 5.35 V when the distance between the R/W and the IC card is equal to 2 mm. This shows that the IC withstand voltage is satisfied. Also, the IC-operating voltage 3V is satisfied up to the inter-R/W-card distance which is close to 20 mm. Accordingly, this distance turns out to be the limit of the communications distance.

As having been explained so far, by employing the design method and design apparatus of the present invention for designing the antenna coil used in the non-contact IC card or the like, it becomes possible to input such input parameters as the antenna configurations which have a predetermined range. This characteristic, accordingly, allows the resistance R, inductance L, and capacitance C of the antenna to be computed without specifying the antenna configurations as a single antenna configuration from the beginning. This computation, further, allows the determination of the self-resonance frequency $f_c$ and the Q value of the antenna, which, namely, are computed by using the computed resistance R, inductance L, and capacitance C.

Moreover, the resonance frequency of each antenna can be determined from the R/W and the capacitance $C_{ic}$ mounted within the IC, and the Q value can be determined from the load resistance. Namely, making a comparison among these computation results makes it possible to design (i.e., specify) the optimum antenna configuration in a final manner.

Incidentally, when designing the optimum antenna configuration, it is possible to take into consideration proximate/remote electric-field/magnetic-field analysis results, and also to set the antenna-supplied electric power. Furthermore, the analysis based on the equivalent circuit also allows the analysis of the electric-power transmission and communications.

Figure 6:
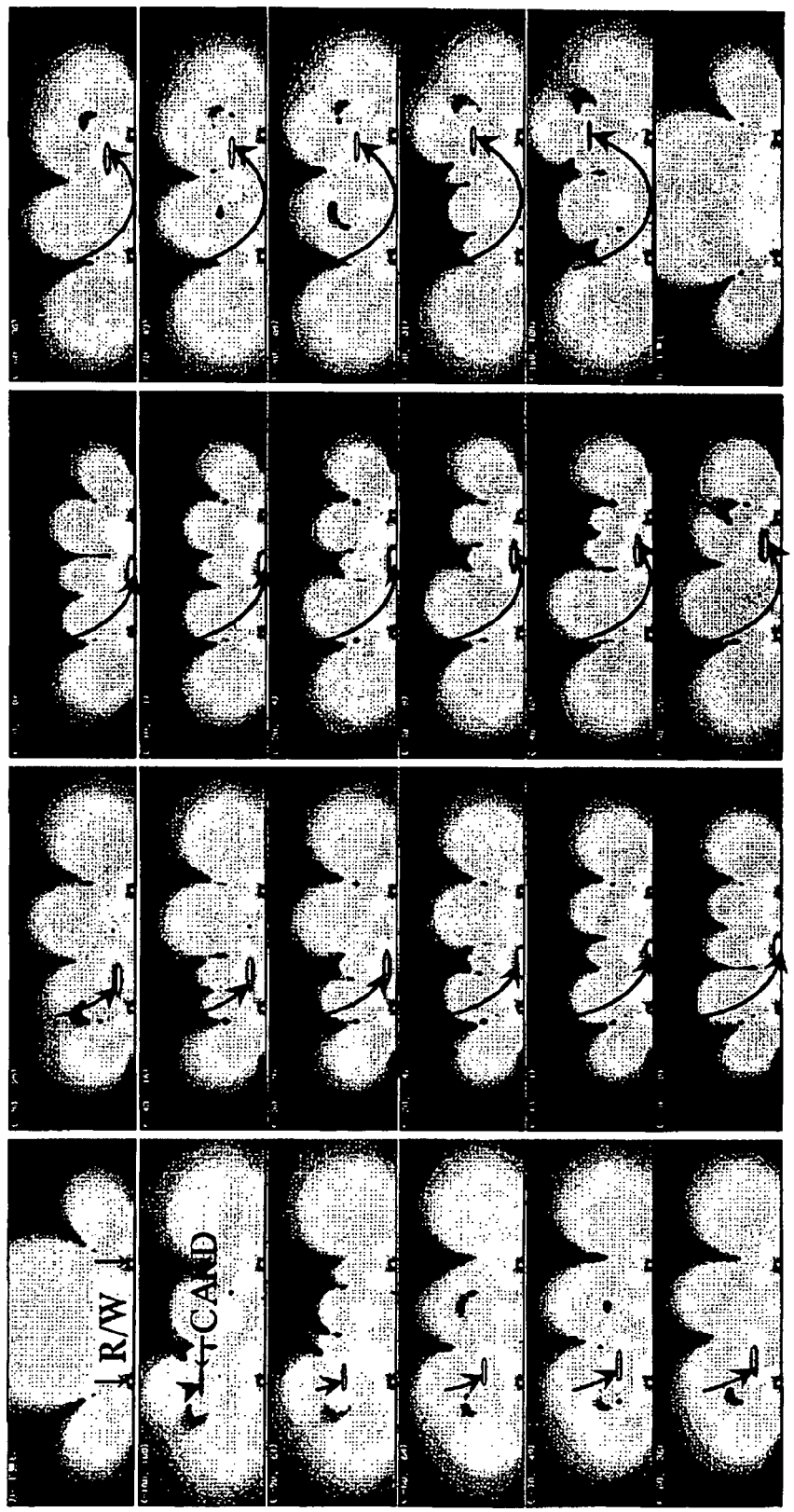
FIG. 6 illustrates an example of analysis result of the antenna according to the present application.

In the above-described description, the explanation has been given concerning the optimum antenna-configuration design. As illustrated in FIG. 6, however, the present analysis method and apparatus allow presentation of a result which is computed as to how the magnetic-field distribution will change when the non-contact IC card having the antenna configuration determined above has passed over the reader/writer unit.

Incidentally, in the above-described description, the outer-configuration, line width, pitch, and line thickness have been presented as the antenna-configuration information to be inputted. As illustrated in FIG. 7, however, it is possible to input a variety of antenna configurations in such a manner that the antenna configurations are made to have predetermined widths.

It becomes possible to design, on a short-time basis, the antenna which satisfies desired electrical characteristic values without the necessity for redesigning the antenna configuration many times in accordance with the analysis result of the electrical characteristics or the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. A method of designing a coil, comprising:
inputting information about plural configurations of a coil and materials thereof;
calculating resistance, inductance, and stray capacitance of said coil relative to number of turns of said coil on said plural configurations of said coil inputted by using parameters including at least ones of outside dimensions, line width, pitch, line thickness and corner radius of said coil;

selecting one of said plural configurations of said coil on a basis of a result of said calculating;

wherein the inputting, calculating and selecting operations are conducted prior to a manufacture of the coil.

2. The coil design method according to claim 1, comprising:

using said calculated resistance, inductance, and stray capacitance of said coil to calculate self-resonance frequency of said coil relative to said number of turns of said coil.

3. The coil design method according to claim 1, wherein said coil is an antenna coil for use in a non-contact IC card or an RFID.

4. The coil design method according to claim 3, comprising:

using said calculated resistance, inductance, and stray capacitance of said antenna coil to analyze a coupling coefficient relative to distance, said coupling coefficient being established between said antenna coil used in said non-contact IC card or said RFID and an antenna coil of a reader/writer, said distance being measured between said antenna coil used in said non-contact IC card or said RFID and said antenna coil of said reader/writer.

5. The coil design method according to claim 4, comprising:

using said calculated resistance, inductance, and stray capacitance of said antenna coil to analyze a communication band of said antenna coil.

6. A method of pre-manufacture designing of a coil, comprising:

inputting information about plural configurations of a coil and materials thereof;

calculating resistance, inductance, and stray capacitance of said coil relative to number of turns of said coil on said plural configurations of said coil inputted by using parameters including at least ones of outside dimensions, line width, pitch, line thickness and corner radius of said coil;

selecting one of said plural configurations of said coil;

wherein the inputting and calculating operations are conducted prior to a manufacture of the coil.

7. The coil design method according to claim 6, comprising:

using said calculated resistance, inductance, and stray capacitance of said coil to, calculate self-resonance frequency of said coil relative to said number of turns of said coil.

8. The coil design method according to claim 6, wherein said coil is an antenna coil for use in a non-contact IC card or an RFID.

9. The coil design method according to claim 8, comprising:

using said calculated resistance, inductance, and stray capacitance of said antenna coil to analyze a coupling coefficient relative to distance, said coupling coefficient being established between said antenna coil used in said non-contact IC card or said RFID and an antenna coil of a reader/writer, said distance being measured between said antenna coil used in said non-contact IC card or said RFID and said antenna coil of said reader/writer.

10. The coil design method according to claim 9, comprising:

using said calculated resistance, inductance, and stray capacitance of said antenna coil to analyze a communication band of said antenna coil.

* * * * *